(12) United States Patent
Boutros et al.

(10) Patent No.: US 10,979,352 B2
(45) Date of Patent: Apr. 13, 2021

(54) USING A CONTROL PLANE TO SET A PREFERRED EGRESS POINT IN MULTI-SITE LOGICAL ROUTERS

(71) Applicant: VMware, Inc., Palo Alto, CA (US)

(72) Inventors: Sami Boutros, Union City, CA (US); Ganesan Chandrashekhar, Campbell, CA (US); Sri Mohana Singamsetty, Cupertino, CA (US); Ankur Dubey, San Jose, CA (US); Abhishek Goliya, Pune (IN)

(73) Assignee: VMware, Inc., Palo Alto, CA (US)

( * ) Notice: Subject to any disclaimer, the term of this patent is extended or adjusted under 35 U.S.C. 154(b) by 7 days.

(21) Appl. No.: 16/442,411

(22) Filed: Jun. 14, 2019

(65) Prior Publication Data
US 2020/0396157 A1 Dec. 17, 2020

(51) Int. Cl.
| H04L 12/741 | (2013.01) |
| H04L 12/721 | (2013.01) |
| H04L 12/715 | (2013.01) |
| H04L 12/761 | (2013.01) |
| H04L 12/713 | (2013.01) |

(52) U.S. Cl.
CPC ............. H04L 45/54 (2013.01); H04L 45/16 (2013.01); H04L 45/44 (2013.01); H04L 45/46 (2013.01); H04L 45/586 (2013.01); H04L 45/74 (2013.01)

(58) Field of Classification Search
CPC ....... H04L 45/586; H04L 45/42; H04L 45/44; H04L 45/66; H04L 41/145; H04L 41/0677; H04L 41/5041; H04L 49/3063; H04L 49/25; H04L 45/54; H04L 45/46; H04L 45/16; H04L 45/74
See application file for complete search history.

(56) References Cited

U.S. PATENT DOCUMENTS

| 2016/0226754 | A1* | 8/2016 | Zhang | H04L 45/745 |
| 2016/0380815 | A1* | 12/2016 | Agarwal | H04L 69/324 |
| | | | | 709/220 |
| 2017/0126497 | A1* | 5/2017 | Dubey | G06F 9/45558 |
| 2017/0288981 | A1* | 10/2017 | Hong | H04L 41/0677 |
| 2017/0317954 | A1* | 11/2017 | Masurekar | H04L 45/586 |
| 2019/0306086 | A1* | 10/2019 | Boutros | H04L 45/66 |
| 2019/0342337 | A1* | 11/2019 | Sundaram | H04L 49/25 |

* cited by examiner

Primary Examiner — Jungwon Chang

(57) ABSTRACT

In some embodiments, a method receives a selection of a logical router in the first computing device in a first site of a plurality of sites as a preferred egress point to an external network for the logical router. The logical router is instantiated on computing devices in the plurality of sites and a single site in the sites is the preferred egress point for the logical router. The method stores identification information for the logical router in a routing table that stores identification information for multiple logical routers. The identification information is unique among multiple logical routers. The method advertises via a routing instance in a control plane to other computing devices in other sites the identification information for the logical router to indicate the logical router in the first computing device in the first site is the preferred egress point.

21 Claims, 8 Drawing Sheets

404 →

| UUID | Local Pref |
|---|---|
| UUID #1 | 100 |
| UUID #2 | 100 |
| UUID #3 | 100 |

| UUID | Local Pref 602 |
|---|---|
| UUID #1 | 200 |
| UUID #2 | 100 |
| UUID #3 | 100 |

FIG. 7B

USING A CONTROL PLANE TO SET A PREFERRED EGRESS POINT IN MULTI-SITE LOGICAL ROUTERS

BACKGROUND

A logical router may span multiple sites, such as multiple data centers. The logical router may include a distributed component referred to as a distributed router that is distributed across hosts in the multiple sites and may also include a centralized component referred to as a service router that may perform centralized functions on an edge node, such as a network address translation (NAT), firewall services, and other services. The service router may also be distributed across multiple sites; however, a service router in one of the sites may be designated as the default gateway for the logical router. This service router will be the preferred egress point for any traffic being routed by the logical router to an external network. Also, the service router is the preferred ingress point from the external network. The use of the preferred egress point (and ingress point) allows the centralized services to always be performed at the same centralized point for the logical router.

The advertisement of the preferred egress point for each logical router may be performed using different methods. For example, a routing instance for each service router on an edge node may be used to distribute the default route to other service routers on other edge nodes. However, the edge node may be hosting a large number of service routers (e.g., thousands), which requires thousands of routing protocol instances. For example, if there are ten sites with 10,000 logical routers, then 100,000 sessions between the logical routers are established to communicate the preferred egress point for each service router.

BRIEF DESCRIPTION OF THE DRAWINGS

FIG. 7A depicts an example of a virtual routing and forwarding table according to some embodiments.

FIG. 7B depicts a second example of the virtual routing and forwarding table according to some embodiments.

DETAILED DESCRIPTION

Figure 1:
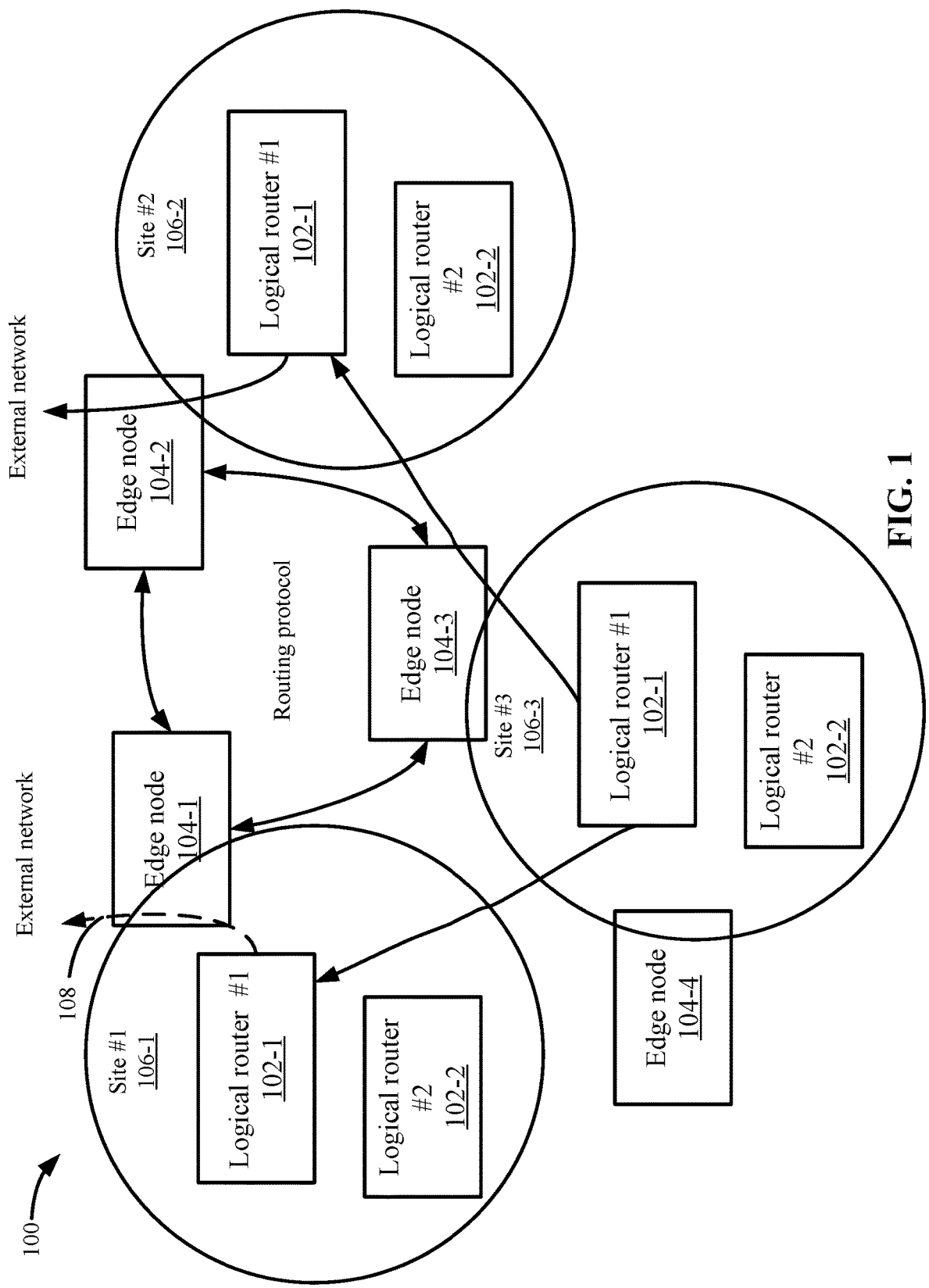
FIG. 1 depicts a simplified system for a multi-site computing environment according to some embodiments.

In the following description, for purposes of explanation, numerous examples and specific details are set forth in order to provide a thorough understanding of embodiments of the present disclosure. Some embodiments as expressed in the claims may include some or all of the features in these examples, alone or in combination with other features described below, and may further include modifications and equivalents of the features and concepts described herein.

Some embodiments use a routing protocol to advertise a preferred egress point for a logical router to external networks among edge nodes in multiple sites. Each edge node comprises a server running edge services gateway (ESG) software and may be instantiated with one or more virtual machines or physical servers (e.g., forming a cluster) at each site. In some embodiments, the logical router includes a service router and a distributed router. The distributed router is distributed across hosts in the multiple sites. A service router for the logical router may also be distributed and exists on edge nodes in the multiple sites. However, a management plane may select one of the service routers in one of the sites to be the gateway for the logical router and the service router is the preferred egress point for the logical router. Alternatively, the preferred egress point may be selected dynamically by an algorithm that is run automatically. Once the preferred egress point is selected for a service router on an edge node, the other service routers on other edge nodes for the logical router are not the preferred egress point and do not connect to an external network.

Edge nodes may use a routing instance that can distribute identification information, such as universally unique identifiers (UUIDs), for locally hosted service routers to advertise the preferred egress point for logical routers among edge nodes in the sites. A first edge node may advertise identification information for a service router as the preferred egress point for a logical router. When a second edge node receives the identification information being advertised as the preferred egress point, the second edge node can set a service router associated with the identification information in the first edge node as the preferred egress point for the logical router. For example, the second edge node sets the next hop network address (e.g., Internet Protocol (IP) address) for the logical router as an IP address of the service router in the first edge node. The logical router (e.g., the distributed router) may then use the service router in the first edge node as the preferred egress point.

Advertising the new preferred egress point between edge nodes to set the preferred egress point for a logical router may decrease the number of sessions needed to communicate the preferred egress point for the logical router. For example, sessions between the edge nodes of each site are established to advertise the preferred egress point. Instead of establishing a session for each logical router instance in each site, only edge nodes communicate the change in the preferred egress point. Also, in some embodiments, only a single routing instance with a single routing table, such as a virtual routing and forwarding (VRF), may be used for all service routers being hosted on an edge node. An edge node may include multiple UUIDs for multiple service routers in the VRF. The UUIDs are globally unique whereas next hop IP addresses may not be unique among service routers. Using the UUIDs allows the edge node to distinguish which service router is being referenced when using a single VRF. Accordingly, using the UUID in the VRF reduces the number of VRFs used.

When the service router that is designated as the preferred egress point goes down, some embodiments select a new service router as the preferred egress point for the logical router, such as service router in a new site. The above method may be used to advertise the new preferred egress point. However, if a first edge node in a first site that was the preferred egress point goes down, but then comes back up, the first edge node should not take over as the preferred egress point for a logical router. But, the first edge node may start to advertise itself as the preferred egress point. When a second edge node receives a UUID for a service router in the first edge node in the first site, the second edge node should not set the service router in the first edge node as the preferred egress point. Some embodiments can use an attribute to make sure the service router in the first edge node does not take over as the preferred egress point. For example, because a routing protocol is being used to advertise the preferred egress point, a routing protocol attribute, such as local preference, may be used to make sure the first site does not take over as the preferred egress point. The local preference may be an attribute that is used to determine a preferred route in the routing protocol and can be advertised in the routing protocol. When the service router in the second site is selected as the preferred egress point, some embodiments set the local preference value for the service router in the second site based on a variable that increases over time. Thus, as time increases, the local preference value increases. The higher local preference value is used to indicate which route is preferred as the next hop. When the service router in the first site comes back up, its local preference value would have been generated with a time value that is before the time value in which the local preference value for the service router in the second site was generated. Accordingly, the second edge node in the second site rejects the advertised service router in the first site as the preferred egress point because the local preference value of the service router in the first site is lower than the local preference value of the service router in the second site.

System Overview

FIG. 1 depicts a simplified system 100 for a multi-site computing environment according to some embodiments. System 100 includes a site #1 106-1, a site #2 106-2, and a site #3 106-3, but other numbers of sites may be used. A site may be a data center that includes multiple computing devices. Communications between sites may be through edge nodes 104-1 to 104-4 that are located at the boundary of a network in the sites and connect to external networks. An edge node may be a virtual machine running on a hypervisor or can be run on a complete bare metal server.

Sites 106 implement logical routers 102, such as a logical router #1 102-1 and a logical router #2 102-2, but any number of logical routers 102 may be implemented. Logical routers 102 may provide north-south, and east-west routing. North-south routing is to and from an external network and east-west routing is between different subnets in a site. Logical routers 102 may be stretched across sites 106, such as a logical router 102 is distributed on multiple host computing devices (e.g., hypervisors) that are running on multiple sites 106. That is, logical router #1 102-1 and logical router #2 102-2 may be running on multiple computing devices in each site 106-1 to 106-3. Each logical router 102 may have two components. One component is a centralized component running in an edge node 104 that is referred to as a service router or (SR). Another component is a distributed component that is referred to as a distributed router (DR) running on different hypervisors to provide connectivity to workloads hosted on hypervisors. It is noted that FIG. 1 depicts a logical view of logical routers 102 and more detailed implementations using the service routers and distributed routers will be described in more detail below.

Each logical router 102 may have a preferred egress point, which is in one of the sites 106. For example, logical router #1 102-1 may have a preferred egress point of edge node 104-2 in site #2 106-2. Other logical routers may have preferred egress points, such as logical router #2 102-2 may have a preferred egress point of edge node 104-1 in site #1 106-1. In some embodiments, clusters may be formed where multiple logical routers 102 have the same egress point in a site. The preferred egress point is in a site that is designated as the site in which packets from logical router 102 are sent to an external network. For example, since logical router 102 is distributed across multiple sites 106, it may be desirable that only one site 106 is the preferred egress point to allow centralized services to be performed at a particular edge node. Using the preferred egress point allows a company to configure services on an edge node 104 that performs the centralized services, such as network address translation (NAT), an edge firewall service, load balancing, connectivity to a physical infrastructure, etc.

Edge nodes 104 use a routing protocol in the control plane to communicate the preferred egress point via the control plane. Edge nodes 104 may use a routing instance that can communicate multiple preferred egress points for multiple service routers among edge nodes 104. In some embodiments, an edge node 104 may use only a single routing table, such as a virtual routing and forwarding (VRF) table, to advertise all service routers being hosted on an edge node as the preferred egress point. When a service router goes down, such as edge node 104-2 in site #2 106-2 may go down, a logical router 102 that uses edge node 104-2 as the preferred egress point needs to switch to another edge node 104 as the preferred egress point in order to maintain communication with external networks. For example, at 108, a management plane or a dynamic process may select edge node 104-1 in site #1 106-1 as the preferred egress point for logical router #1 102-1 when edge node 104-2 goes down in site #2 106-2. As will be discussed in more detail below, edge nodes 104 use the routing protocol to communicate the new preferred egress point for logical router #1 102-1. Also, the use of a routing protocol attribute, such as local preference, also guards against edge node 104-2 in prior site #2 106-2 coming back up and attempting to take over the preferred egress point after the switch to site #1 106-1.

Logical Router Implementation

Figure 2:
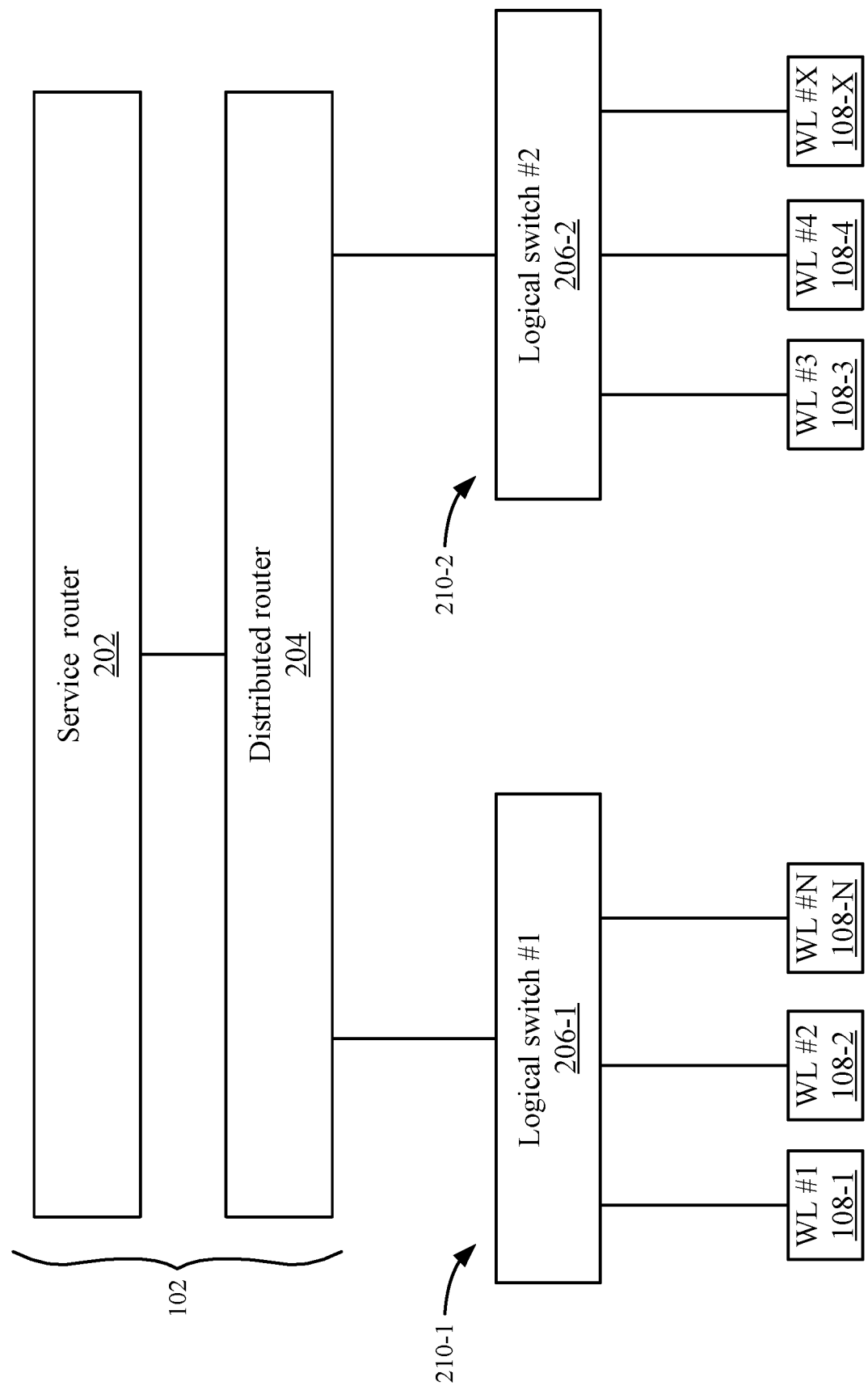
FIG. 2 depicts an example of a logical router according to some embodiments.

Before discussing the setting of preferred egress points, one structure of a logical router 102 will be described. Although this structure is described, other structures may be appreciated. FIG. 2 depicts a more detailed example of a logical router 102 according to some embodiments. Logical router 102 may include a service router 202 and a distributed router 204.

Logical router 102 routes traffic at L3 (layer 3—network layer) between different logical networks. Specifically, logical router 102 routes network traffic between two or more logical switches. In some embodiments, logical router 102 is implemented in a single managed switching element while in other embodiments a logical router is implemented in several different managed switching elements in a distributed manner. Logical router 102 routes the network traffic at the L3 between the logical networks 210-1 and 210-2. Specifically, logical router 102 routes the network traffic between the two logical switches 206-1 and 206-2.

Logical switches 206 are implemented across several managed switching elements (not shown). Logical switch 206-1 routes network traffic between workloads 108-1 to 108-N at L2 (layer 2). That is, logical switch 206-1 makes switching decisions to route network data at the data link layer between workloads 108-1 to 108-N based on one or more forwarding table entries (not shown) that the logical switch uses. Logical switch 206-2 is another logical switch that routes the traffic between workloads 108-3 to 108-X for logical network 210-2.

Workloads 108 are machines that are capable of exchanging data packets. For instance, each workload 108 has a network interface controller (NIC) so that applications that execute on respective workloads 108 can exchange data between them through logical switches 206 and logical router 102. Workloads may refer to virtual machines that are running on a respective host, but this is one example of a virtualized computing instance or compute node. Any suitable technology may be used to provide a workload. Workloads may include not only virtual machines, but also containers (e.g., running on top of a host operating system without the need for a hypervisor or separate operating system or implemented as an operating system level virtualization), virtual private servers, client computers, etc. The workloads may also be complete computation environments containing virtual equivalents of the hardware and software components of a physical computing system. Also, as used herein, the term hypervisor may refer generally to a software layer or component that supports the execution of multiple workloads including system-level software that supports name space containers.

In operation, at least from the perspective of workloads 108, logical switches 206-1 and 206-2 and logical router 102 function like physical switches and routers. For instance, logical switch 206-1 routes data packets originating from one of workloads 108-1 to 108-N and heading to another of workloads 108-1 to 108-N. When the logical switch 206-1 in the logical network 210-1 receives a data packet that is destined for one of workloads 108-3 to 108-X in logical network 210-2, logical switch 206-1 sends the packet to the logical router 102. Logical router 102 (e.g., distributed router 204) then routes the packet, based on the information included in the header of the packet, to the logical switch 206-2. Logical switch 206-2 then routes the packet to one of workloads 108-3 to 108-X. Data packets originating from one of workloads 108-3 to 108-X are routed by the logical switches 206-1 and 206-2 and the logical router 102 in a similar manner.

The logical networks 210-1 and 210-2 are different in that workloads in each network may use different L3 prefixes. For instance, the logical networks 210-1 and 210-2 are different IP subnets for two different departments of a company. Although not shown, logical router 102, logical switches 206 and workloads 108 may be distributed and instantiated on hypervisors of one or more host computing devices. Host computing devices may include an instance of logical router 102 and/or an instance of logical switch 106. For example, host computing devices associated with workload #1 108-1 to workload #N 108-N on logical network 210-1 may run instances of logical switch #1 206-1 and host computing devices associated with workload #3 108-3 to workload #X 108-X on logical network 210-2 may run instances of logical switch #2 206-2. Host computing devices in logical network 210-1 and logical network 210-2 may also be running an instance of logical router 102. Further details of logical routers and logical switches are described in U.S. Pat. No. 9,369,426, entitled "DISTRIBUTED LOGICAL L3 ROUTING", filed Aug. 17, 2012, which claims priority to U.S. provisional application No. 61/524,754, filed on Aug. 17, 2011, U.S. provisional application No. 61/643,753394, filed on May 6, 2012, U.S. provisional application No. 61/654,121, filed on Jun. 1, 2012, and U.S. provisional application No. 61/666,876, filed on Jul. 1, 2012, all which are incorporated by reference in their entirety. Another example implementation of this type of logical router architecture is described in detail in U.S. Pat. No. 9,787,605, granted Oct. 10, 2017, which is also incorporated herein by reference in its entirety.

Distributed router 204 may perform the above routing between logical networks 210-1 and 210-2. When data packets are routed to external networks, service router 202 processes the packets before sending the packets to the external network. In this case, distributed router 204 may forward a packet that is sent to an external network via a next hop IP address to a service router 202 that is designated as the preferred egress point for logical router 102.

Multiple Site Implementation

Figure 3A:
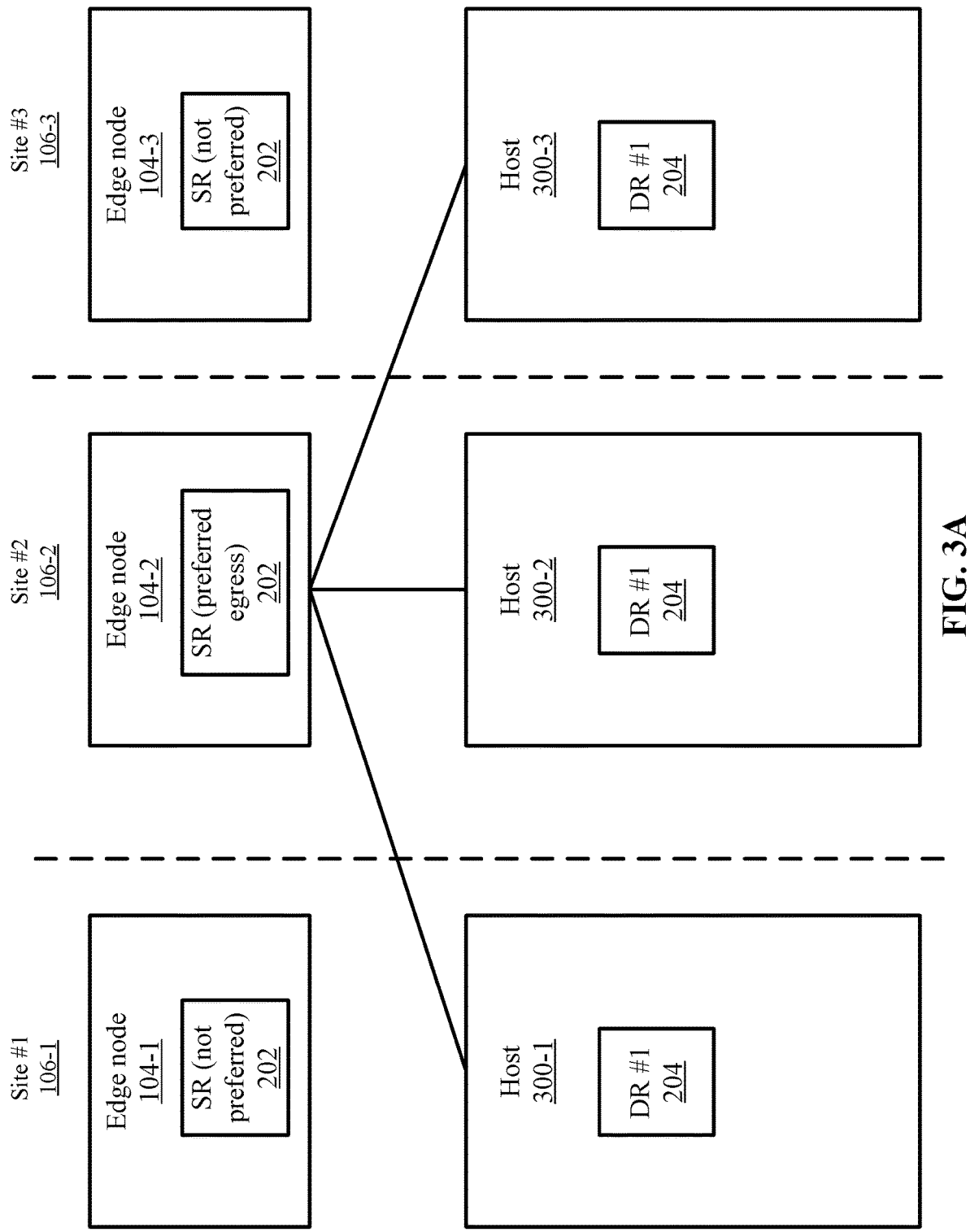
FIG. 3A depicts a more detailed example of the logical router in a multi-site environment according to some embodiments.

FIG. 3A depicts a more detailed example of a logical router 102 in a multi-site environment according to some embodiments. Although one logical router 102 is described, other logical routers may be implemented similarly. That is, edge nodes 104 and hosts 300 may be running multiple service routers and distributed routers. Edge nodes 104 may also be running both service routers and distributed routers.

Site #1 106-1 includes a host 300-1; site #2 106-2 includes a host 300-2; and site #3 106-3 includes a host 300-3. Hosts 300 may be computing devices operated by operating systems and include a hypervisor that manages workloads (not shown) running on hosts 300.

Logical router 102 includes a service router 202 and a distributed router 204 that may be running on hypervisors of hosts 300 or edge nodes 104. As discussed above, distributed router 204 is distributed across multiple hosts 300-1 to 300-3 in multiple sites. For example, hosts 300-1 to 300-3 are each implementing an instantiation of distributed router 204.

A service router 202 of logical router 102 may also be stretched across edge nodes 104-1 to 104-3 in sites #1 106-1 to site #3 106-3. Although an instance of service router 202-1 is instantiated on multiple edge nodes 104 in multiple sites 106, logical router #1 102 designates one of the service routers 202 as the preferred egress point. For example, service router 202 in edge node 104-2 is designated as the preferred egress point for logical router 102. Service router 202 in edge node 104-1 and service router 202 in edge node 104-3 as not designated as the preferred egress point for logical router 102. In this case, service router 202 in edge node 104-1 and service router 202 in edge node 104-3 do not route packets to an external network for logical router 102, such as each service router 202 in edge node 104-1 and service router 202 in edge node 104-3 may take down an interface to the external network.

Figure 3B:
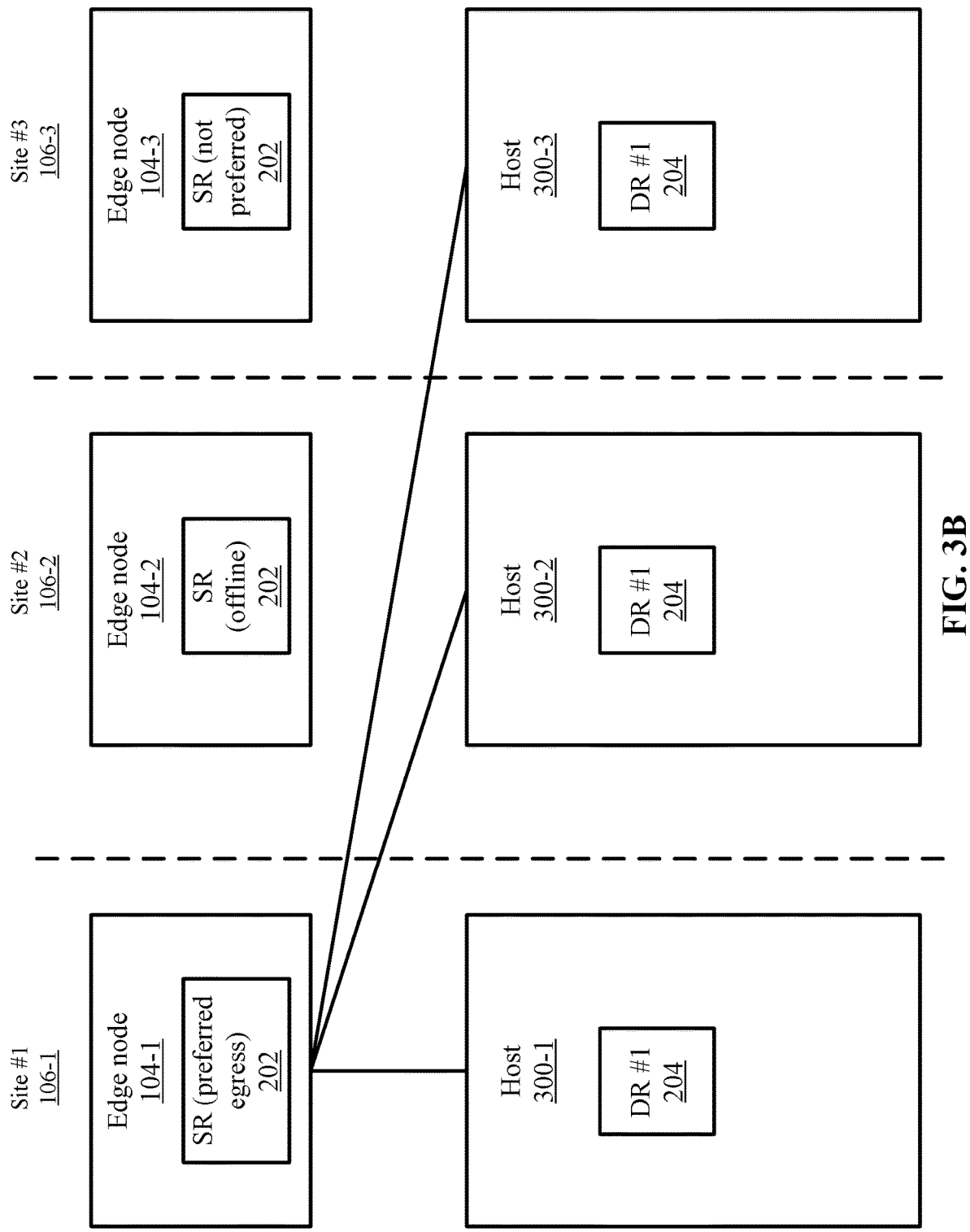
FIG. 3B depicts an example of the logical router when the preferred egress point goes down according to some embodiments.

FIG. 3B depicts an example of logical router 102 when the preferred egress point goes down according to some embodiments. In this example, service router 202 in edge node 104-2 may go down, which makes service router 202 in edge node 104-2 unreachable. Accordingly, a process (e.g., the management plane or an automatic algorithm) may designate another service router 202 as the preferred egress point. For example, the process has designated service router 202 in edge node 104-1 of site #1 106-1 as the preferred egress point. Packets to an external network from distributed router 204 in sites 106-1 to 106-3 are routed to service router 202 in edge node 104-1 for egress to the external network. In this example, service router 202 in edge node 104-2 in site #2 106-2 is offline and service router 202 in site #3 106-3 is still designated as not being the preferred egress point.

Preferred Egress Point Processing

Figure 4:
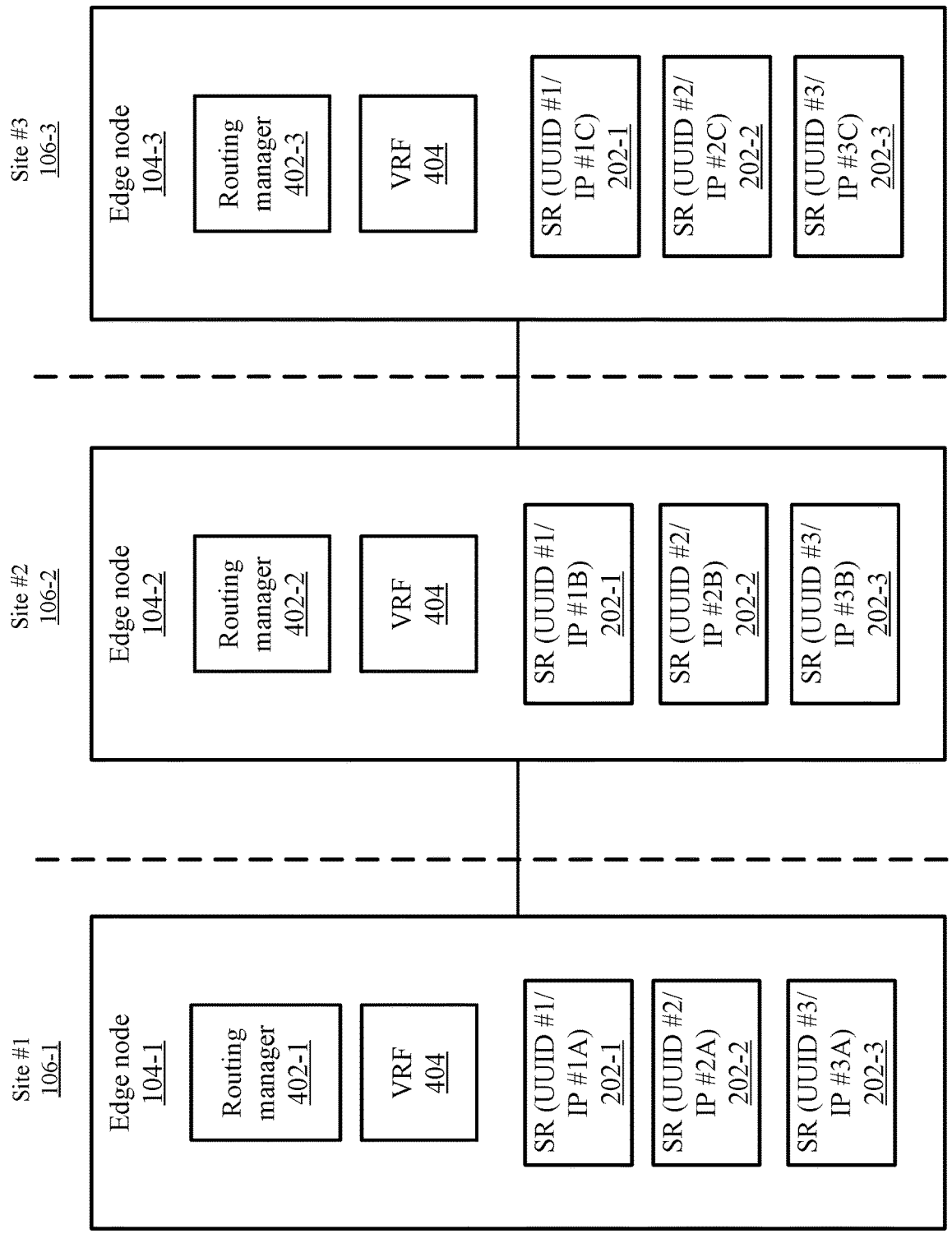
FIG. 4 depicts a more detailed example of edge nodes according to some embodiments.

The following will describe the processing performed to set a preferred egress point. FIG. 4 depicts a more detailed example of edge nodes 104 according to some embodiments. Edge nodes 104-1 to 104-3 include routing managers 402-1 to 402-3, respectively. Routing managers 402-1 to 402-3 manage a routing table, such as virtual routing and forwarding (VRF) table 404, that is used to set the preferred egress point. VRF 404 may not be used to perform actual routing of packets.

Edge nodes 104 may include multiple service routers 202-1 to 202-3, such as three service routers are shown that are stretched across edge nodes 104-1 to 104-3. A service router 202 may include the same UUID in each edge node 104-1 to 104-3 for a given logical router 102, but each service router 202 may have a different IP address in each edge node 104-1 to 104-2. For example, service router 202-1 in edge node 104-1 includes UUID #1 with an IP address of #1A, service router 202-1 in edge node 104-2 includes UUID #1 with an IP address of #1B, service router 202-1 in edge node 104-3 includes UUID #1 with an IP address of #1C. Service router 202-2 and service router 202-3 are similar in that each service router includes the same UUID #2 and UUID #3, respectively, in all edge nodes 104, but different IP addresses (e.g., IP #2A to IP #2C and IP #3A to IP #3C, respectively).

Instead of using a VRF 404 for each logical router 102, edge nodes 104 use a single VRF 404. However, IP addresses for service routers 202 may not be unique at an edge node 104. Accordingly, instead of advertising IP addresses for service routers 202, edge nodes 104 advertise UUIDs for service routers 202. The UUIDs are globally unique and can be inserted into a single VRF. Although a UUID will be described, other identification information that can uniquely identify service routers to edge nodes may be used. The IP addresses for service routers 202 could be used to advertise the preferred egress point, but this would require a separate VRF for each service router to make the IP address distinguishable to an edge node 104.

Routing managers 402 may set UUIDs in VRF 404 that are advertised among the edge nodes. For example, routing manager 402-1 sets UUIDs for service routers 202 that are the preferred egress for a logical router 102 and are local to edge node 104-1 in site #1. Similarly, routing manager 402-2 sets UUIDs for service routers 202 that are the preferred egress for a logical router 102 and are local to edge node 104-2 in site #2, and so on. Edge nodes 104 may then export the UUIDs to other edge nodes 104 in a routing instance, which may be logical instance of a router that is used to distributed the preferred egress point for multiple service routers 202 in the control plane instead of a prefix for a route.

The following will describe how the UUIDs are used to set the preferred egress point. Then, the process of using a local preference value to determine whether to set a new preferred egress point will be described.

Figure 5:
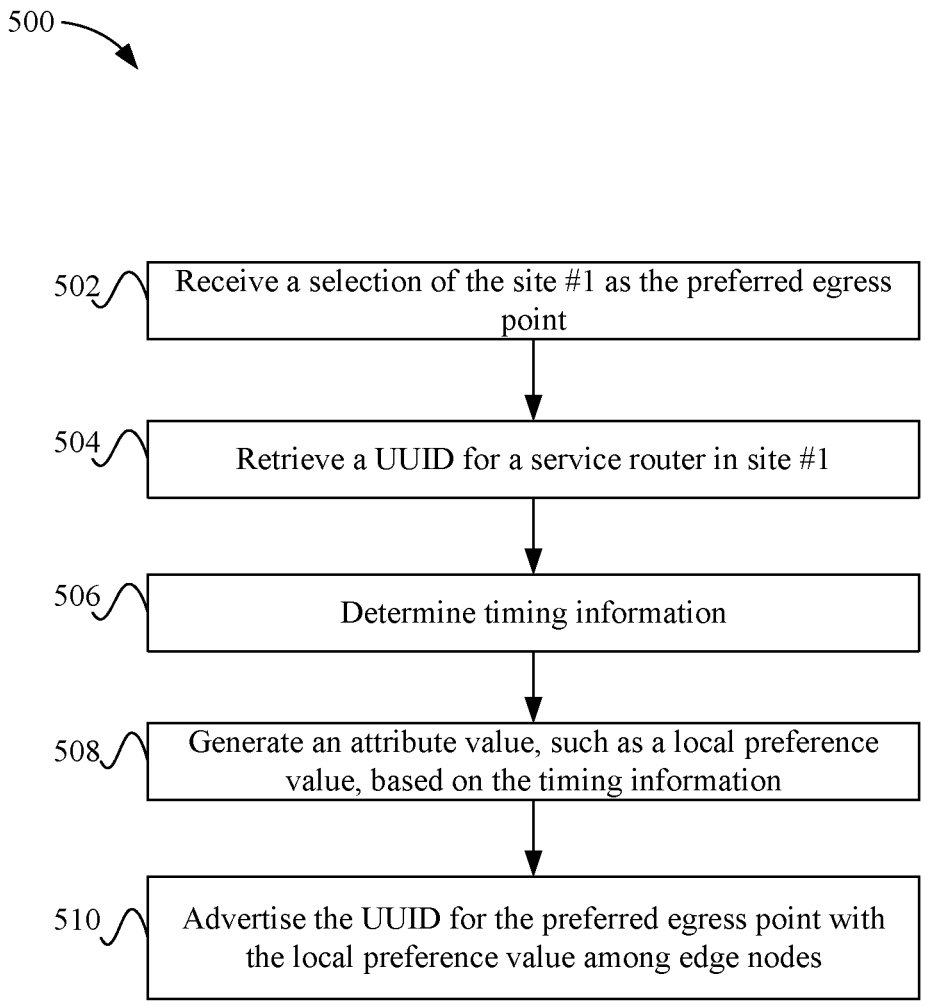
FIG. 5 depicts a simplified flowchart of a method for setting a preferred local egress point according to some embodiments.

FIG. 5 depicts a simplified flowchart 500 of a method for setting a preferred local egress point according to some embodiments. At 502, routing manager 402 receives a selection of edge node 104-1 in site #1 106-1 as the preferred egress point for a service router 202. For example, an edge node 104-2 in site #2 106-2 that is the preferred egress point goes down and a new preferred egress point is selected. At 504, routing manager 402 retrieves identification information, such as a UUID, for service router 202 in site #1 106-1.

At 506, routing manager 402 determines timing information, which may be a timestamp, a count from a counter, or another timing mechanism. The timing information increases as time elapses. Although an increase in time is discussed, the timing information may decrease from a number also. As time elapses, the timing information may change on a linear basis, such as increase.

At 508, routing manager 402 generates an attribute value, such as a local preference value, based on the timestamp. The local preference value may be a routing protocol attribute that indicates a preference to use when routing packets. For example, border gateway protocol (BGP) includes an attribute called local preference that can be set for routing paths. The higher the local preference value, the higher preference a route is given. In this case, when the timing information is higher, the management plane generates a higher local preference value and conversely, when the timing information is lower, the management plane generates a lower local preference value. The local preference value will be used when there is a change to the preferred egress point and will be described in more detail below.

At 510, routing manager 402 advertises the UUID for the preferred egress point and the local preference value among edge nodes. In some embodiments, the BGP protocol is used to advertise the UUID and the local preference value in the routing instance. Also, in some embodiments, the UUID may be a 16-byte globally unique identifier. The routing instance may be typically used to send a 128-bits prefix route for a service router. However, using the routing instance, edge nodes 104 may want to advertise the preferred egress point, and include multiple UUIDs for multiple service routers 202. This allows edge nodes 104 to update the preferred egress point for multiple logical routers 102 using one routing instance. For example, service routers 202 may be clustered in an edge node 104 in a single site 106. When that site 106 goes down, multiple logical routers 102 may need to change their preferred egress point. By including multiple UUIDs in a single VRF in a routing instance, some embodiments reduce the number of routing instances and VRFs that need to be used to change the preferred egress point for multiple service routers 202.

The following will now discuss the processing at an edge node 104 when receiving a UUID and a local preference value for a routing instance according to some embodiments.

Preferred Egress Change Processing

When a new preferred egress point is selected, an edge node 104 may advertise a UUID for a service router 202 and a local preference value. For example, originally, service router 202-2 in edge node 104-2 is the preferred egress point for logical router 102-1, but edge node 104-2 goes down. Then, service router 202-1 in edge node 104-1 is selected as the new preferred egress point for a logical router 102-1. A routing manager 402-1 in edge node 104-1 may set a UUID of service router 202-1 with a local preference value in VRF 404. Edge node 104-1 then advertises the UUID to other edge nodes 104. The following will describe the processing at edge node 104-3 in site #3 when service router 202 of edge node 104-1 becomes the preferred egress point. Similar processing may be performed in other edge nodes 104.

Figure 6:
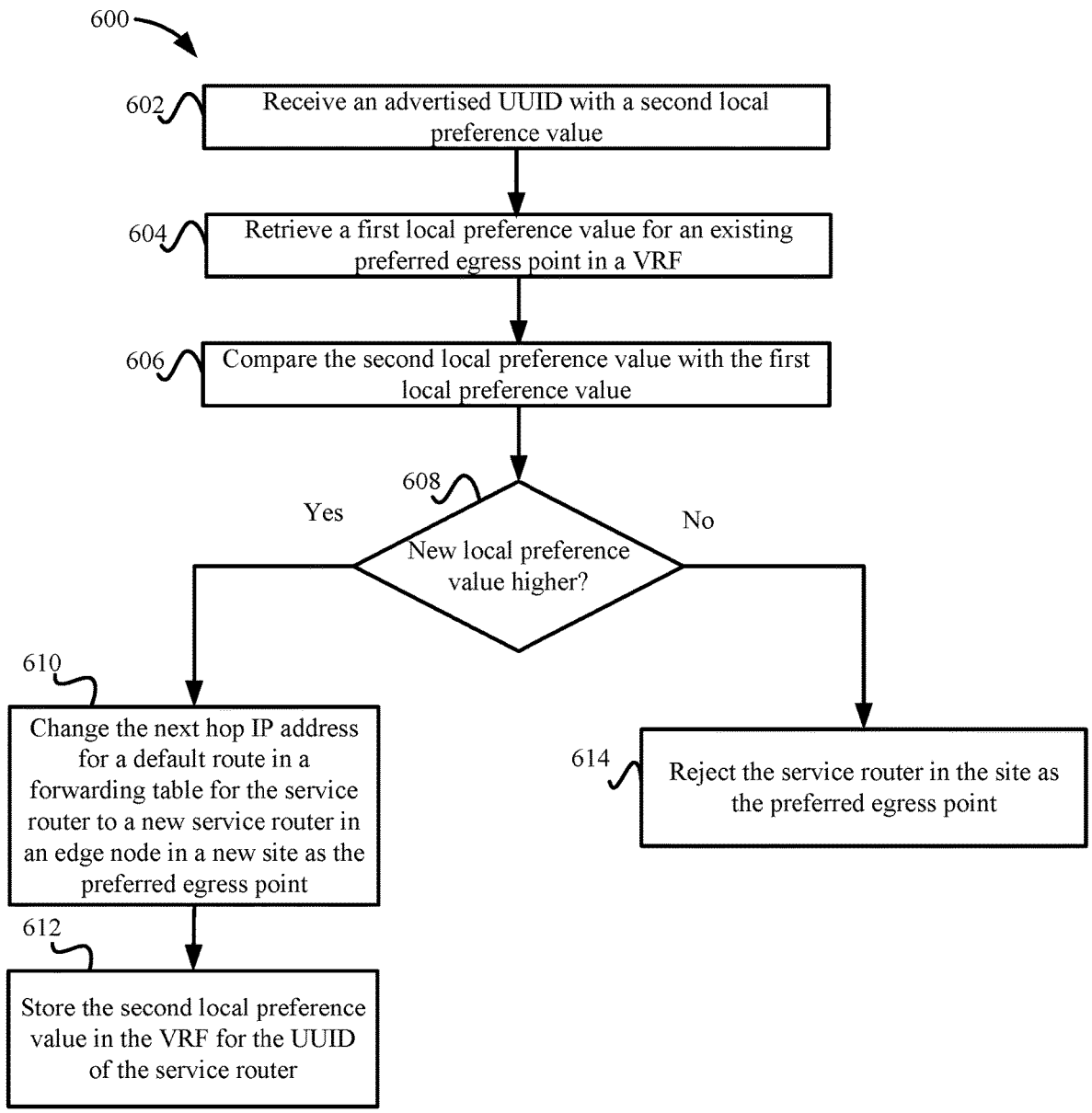
FIG. 6 depicts a simplified flowchart of a method for processing a change to a preferred egress point according to some embodiments.

FIG. 6 depicts a simplified flowchart 600 of a method for processing a change to a preferred egress point according to some embodiments. At 602, edge node 104-3 receives an advertised UUID #1 and a second local preference value from edge node 104-1. The second local preference value may have been generated after time in which a first local preference value was generated. That is, the first local preference value was generated when service router 202 in edge node 104-2 was the preferred egress point.

At 604, edge node 104-3 retrieves the first local preference value for an existing preferred egress point in VRF 404 for UUID #1. For example, edge node 104-3 locates an instance of the UUID #1 in VRF 404 for logical router 102-1, which may have set the preferred egress point as service router 202 in edge node 104-2 in site #2 106-2 as the preferred egress point. That route may have included the first local preference value. FIG. 7A depicts an example of VRF 404 according to some embodiments. VRF 404 includes UUIDs #1 to #3 for multiple service routers 202-1 to 202-3. Each UUID is associated with a local preference value. For example, UUID #1 is associated with a local preference value of 100.

At 606, routing manager 402-3 compares the second local preference value with the first local preference value. At 608, routing manager 402-3 determines if the second local preference value is higher than the first local preference value. In this example, the second local preference value was generated after the first local preference value. Because the second local preference value is generated using timing information that has increased since the first local preference value was generated, the second local preference value is higher than the first local preference value. For example, the second location preference value may be 200 compared to a value of 100 for the first local preference value.

If the second local preference value is higher than the first local preference value, at 610, routing manager 402-3 changes the service router for logical router 102-1 to a new edge node 104-1 in site #1 106-1 as the preferred egress point. For example, routing manager 402-3 changes the next hop IP address in a forwarding table for logical router 102-1 to the IP address for service router 202-1 in edge node 104-1 in site #1 106-1. The forwarding table is used by distributed routers 204-1 to forward packets to service router 202-1 in edge node 104-1 in site #1 106-1, such as via tunnels. The forwarding table is different from VRF 404 in that the forwarding table is used in the data plane and includes the next hop IP address while VRF 404 is used in the control plane and includes UUIDs to set the preferred egress point. That is, the UUID is not used in the data plane to forward packets. Routing manager 402-3 may determine the next hop IP address to set in the forwarding table by determining the edge node that advertised the UUID and setting the IP address of the respective service router 202 in that edge node as the next hop IP address for the logical router.

At 612, routing manager 402-3 stores the second local preference value with the UUID for service router 202. FIG. 7B depicts a second example of VRF 404 according to some embodiments. At 602, the local preference value for UUID #1 has been changed to a value of 200 from a value of 100.

Site #2 106-2 may come back up at some point, such as service router 202-1B is now functional in edge node 104-2. At this point, edge node 104-2 may advertise the UUID #1 of service router 202-1 in edge node 104-2 as the preferred egress point. VRF 404 at edge node 104-2 includes the first local preference value (which is the same local preference value from before edge node 104-2 in site #2 106-2 went down). In this case, edge node 104-3 (and other edge nodes) will receive the message with UUID #1 and the first local preference value of 100. As discussed above, the first local preference value was generated at a time that was before the time used to generate the second local preference value. Accordingly, the second local preference value is higher than the first local preference value. Referring to the processing in FIG. 6, edge node 104-3 performs 502, 504, 506, and 508 in FIG. 5 as described above. However, the second local preference value is set with a value of 200 for UUID #1 now. Thus, the first local preference value of 100 is not higher than the second local preference value of 200. At 614, routing manager 402-3 rejects service router 202-1 in edge node 104-2 as the preferred egress point. UUID #1 is still associated with the local preference value of 200 and the next hop IP address in the forwarding table for logical router 102 in the data plane is not changed.

Accordingly, service router 202-1 in edge node 104-2 cannot take over as the preferred egress point from service router 202-1 in edge node 104-1 when service router 202-1 in edge node 104-2 comes back up. When using the routing protocol to set the preferred egress point, using the local preference value that is based on timing information that increases as time elapses allows an attribute of the routing protocol to be used to set the preferred egress point for a logical router 102. If the local preference value was not used, then it is possible that when service router 202-1 in edge node 104-2 comes back up, it could replace service router 202-1 in edge node 104-1 as the preferred egress point. The above processing may also be performed by other edge nodes, such as edge node 104-1. Furthermore, edge node 104-2 may prefer edge node 104-1 as the preferred egress point for service router 202-1, given that the local preference of edge node 104-1 is higher than the local preference at the restarted edge node 104-2.

An edge node 104-3 may receive an advertised UUID indicating that a service router 202 in an edge node 104-1 is the preferred egress point, but that edge node 104-3 does not include an instantiation of the service router 202, and in this case, edge node 104-3 may maintain the UUID to handle the case when service router 202 is instantiated in the future.

Packet Routing

A distributed router 204 may send a packet to a service router 202 that is designated as the preferred egress point. For example, a virtual IP address associated with a service router 202 chosen as the preferred egress point is set in the forwarding table in case of active/standby configuration for the service router at the preferred site. A distributed router 204 then sends packets to the service router virtual IP address next hop, which is routed via an intra-site transit link, such as a tunnel.

Within a site 106, a service router 202 that is designated as the preferred egress point may have an active/standby configuration. For an active/standby configuration within a site 106, the network may have an IP address for each service router 202 and a virtual IP address that can be owned by the active service router 202 only. This VIP is used as the next hop for all routes advertised to other service routers 202.

The management plan sets up an inter-service router session such that the active/standby service router peers to remote active/standby service routers in all sites 106, and sets up a routing map to set the next hop as a VIP for all routes advertised to service routers 202 in other sites 106 on the routing back plane. When the active goes down, the standby service router can take over for the active service router and claim the VIP address via data plane mechanisms such as address resolution protocol (ARP), given that the service router active/standby implementation has symmetric network connectivity.

CONCLUSION

Accordingly, a routing protocol may be used to advertise the preferred egress point for a logical router 102 among edge nodes 104. Using a routing instance that advertises multiple UUIDs for service routers 202 reduces the number of routing instances and a single VRF can be used. Further, using a local preference value that is based on timing information that increases as time elapses allows the local egress point to not be taken over by a logical router that has gone down and then come back up while leveraging an attribute of the routing protocol.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

Some embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of embodiments. In general, structures and functionality presented as separate components in exemplary configurations can be implemented as a combined structure or component. Similarly, structures and functionality presented as a single component can be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

What is claimed is:

1. A method comprising:

receiving, by a first computing device, a selection of a logical router in the first computing device in a first site of a plurality of sites as a preferred egress point to an external network for the logical router, wherein the logical router is instantiated on computing devices in the plurality of sites, and wherein a single site in the plurality of sites is the preferred egress point for the logical router;

storing, by the first computing device, identification information for the logical router in a first table that stores identification information for setting the preferred egress point, wherein the first table is used in a control plane to set the preferred egress point; and advertising, by the first computing device, via a routing instance in the control plane to other computing devices in other sites in the plurality of sites, the identification information for the logical router to indicate the logical router in the first computing device in the first site is the preferred egress point, wherein a second computing device in a second site uses the identification information to set a next hop address in a second table that the logical router in the second site uses in a data plane to forward packets to the logical router in the first computing device in the first site.

2. The method of claim 1, further comprising:

generating a first attribute value for the identification information, the first attribute value being generated based on a reference that changes over time, wherein:

the second computing device uses the identification information to identify a second attribute value that was generated based on the reference, and
the second computing device sets the next hop address for the logical router in the second site as the address for the logical router in the first computing device in the first site when the first attribute value is higher in value than the second attribute value.

3. The method of claim 2, wherein:
after setting the next hop address, the second computing device receives the identification information and the second attribute value, and
the second computing device does not change the next hop address for the logical router in the second site for the logical router in the first computing device in the first site as the address for the logical router in the first computing device in the first site when the second attribute value is lower in value than the first attribute value.

4. The method of claim 1, wherein:
the selection of the logical router in the first computing device in the first site of the plurality of sites as the preferred egress point is received when another logical router in a second site in the plurality of sites become unreachable, and
the another logical router sets the next hop address as the address for the logical router in the first computing device in the first site when the another logical router is reachable.

5. The method of claim 1, wherein advertising via the routing instance comprises using a single first table to set the preferred egress point for multiple logical routers.

6. The method of claim 1, wherein:
multiple preferred egress points for multiple logical routers are advertised in the routing instance, and
the identification information allows the second computing device to uniquely identify the logical router from other logical routers in the first table.

7. The method of claim 1, wherein:
the logical router comprises a service router that is centralized on an edge node and a distributed router that is distributed across multiple computing devices, and
the service router is distributed on multiple edge nodes in multiple sites and one service router is designated as the preferred egress point for the distributed routers.

8. A non-transitory computer-readable storage medium containing instructions, that when executed, control a first computing device to be operable for:
receiving a selection of a logical router in the first computing device in a first site of a plurality of sites as a preferred egress point to an external network for the logical router, wherein the logical router is instantiated on computing devices in the plurality of sites, and wherein a single site in the plurality of sites is the preferred egress point for the logical router;
storing dentification information for the logical router in a first table that stores identification information for setting the preferred egress point, wherein the first table is used in a control plane to set the preferred egress point; and
advertising, via a routing instance in the control plane to other computing devices in other sites in the plurality of sites, the identification information for the logical router to indicate the logical router in the first computing device in the first site is the preferred egress point, wherein a second computing device in a second site uses the identification information to set a next hop address in a second table that the logical router in the second site uses in a data plane to forward packets to the logical router in the first computing device in the first site.

9. The non-transitory computer-readable storage medium of claim 8, further operable for:
generating a first attribute value for the identification information, the first attribute value being generated based on a reference that changes over time, wherein:
the second computing device uses the identification information to identify a second attribute value that was generated based on the reference, and
the second computing device sets the next hop address for the logical router in the second site as the address for the logical router in the first computing device in the first site when the first attribute value is higher in value than the second attribute value.

10. The non-transitory computer-readable storage medium of claim 9, wherein:
after setting the next hop address, the second computing device receives the identification information and the second attribute value, and
the second computing device does not change the next hop address for the logical router in the second site for the logical router in the first computing device in the first site as the address for the logical router in the first computing device in the first site when the second attribute value is lower in value than the first attribute value.

11. The non-transitory computer-readable storage medium of claim 8, wherein:
the selection of the logical router in the first computing device in the first site of the plurality of sites as the preferred egress point is received when another logical router in a second site in the plurality of sites become unreachable, and
the another logical router sets the next hop address as the address for the logical router in the first computing device in the first site when the another logical router is reachable.

12. The non-transitory computer-readable storage medium of claim 8, wherein advertising via the routing instance comprises using a single first table to set the preferred egress point for multiple logical routers.

13. The non-transitory computer-readable storage medium of claim 8, wherein:
multiple preferred egress points for multiple logical routers are advertised in the routing instance, and
the identification information allows the second computing device to uniquely identify the logical router from other logical routers in the first table.

14. The non-transitory computer-readable storage medium of claim 8, wherein:
the logical router comprises a service router that is centralized on an edge node and a distributed router that is distributed across multiple computing devices, and
the service router is distributed on multiple edge nodes in multiple sites and one service router is designated as the preferred egress point for the distributed routers.

15. A first computing device comprising:
one or more computer processors; and
a non-transitory computer-readable storage medium comprising instructions, that when executed, control the one or more computer processors to be operable for:

receiving a selection of a logical router in the first computing device in a first site of a plurality of sites as a preferred egress point to an external network for the logical router, wherein the logical router is instantiated on computing devices in the plurality of sites, and wherein a single site in the plurality of sites is the preferred egress point for the logical router;

storing dentification information for the logical router in a first table that stores identification information for setting the preferred egress point, wherein the first table is used in a control plane to set the preferred egress point; and advertising, via a routing instance in the control plane to other computing devices in other sites in the plurality of sites, the identification information for the logical router to indicate the logical router in the first computing device in the first site is the preferred egress point, wherein a second computing device in a second site uses the identification information to set a next hop address in a second table that the logical router in the second site uses in a data plane to forward packets to the logical router in the first computing device in the first site.

16. The apparatus of claim 15, further operable for:

generating a first attribute value for the identification information, the first attribute value being generated based on a reference that changes over time, wherein:

the second computing device uses the identification information to identify a second attribute value that was generated based on the reference, and the second computing device sets the next hop address for the logical router in the second site as the address for the logical router in the first computing device in the first site when the first attribute value is higher in value than the second attribute value.

17. The apparatus of claim 16, wherein:
after setting the next hop address, the second computing device receives the identification information and the second attribute value, and the second computing device does not change the next hop address for the logical router in the second site for the logical router in the first computing device in the first site as the address for the logical router in the first computing device in the first site when the second attribute value is lower in value than the first attribute value.

18. The apparatus of claim 15, wherein:
the selection of the logical router in the first computing device in the first site of the plurality of sites as the preferred egress point is received when another logical router in a second site in the plurality of sites become unreachable, and the another logical router sets the next hop address as the address for the logical router in the first computing device in the first site when the another logical router is reachable.

19. The apparatus of claim 15, wherein advertising via the routing instance comprises using a single first table to set the preferred egress point for multiple logical routers.

20. The apparatus of claim 15, wherein:
multiple preferred egress points for multiple logical routers are advertised in the routing instance, and the identification information allows the second computing device to uniquely identify the logical router from other logical routers in the first table.

21. The apparatus of claim 15, wherein:
the logical router comprises a service router that is centralized on an edge node and a distributed router that is distributed across multiple computing devices, and the service router is distributed on multiple edge nodes in multiple sites and one service router is designated as the preferred egress point for the distributed routers.

* * * * *